US009639442B2

(12) United States Patent
Selvaraj et al.

(10) Patent No.: US 9,639,442 B2
(45) Date of Patent: May 2, 2017

(54) MODIFIED CONDITION/DECISION COVERAGE TEST CASE AUTOMATION

(71) Applicant: HCL Technologies Limited, Chennai (IN)

(72) Inventors: Hubert Jain Selvaraj, Bangalore (IN); Kamaraj Thangavelu, Bangalore (IN); Ravishankar Piramanayagam, Bangalore (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 367 days.

(21) Appl. No.: 14/013,583

(22) Filed: Aug. 29, 2013

(65) Prior Publication Data

US 2014/0068364 A1     Mar. 6, 2014

(30) Foreign Application Priority Data

Aug. 29, 2012    (IN) ............................ 3571/CHE/2012

(51) Int. Cl.
*G01R 31/28*      (2006.01)
*G06F 11/22*      (2006.01)
*G06F 11/36*      (2006.01)

(52) U.S. Cl.
CPC ...... *G06F 11/2252* (2013.01); *G06F 11/3676* (2013.01)

(58) Field of Classification Search
CPC ............. G06F 11/2252; G06F 11/3676; G06F 11/3664; G06F 11/3672
USPC ............................ 714/32, 737; 717/125, 126
See application file for complete search history.

(56) References Cited

U.S. PATENT DOCUMENTS

| | | | |
|---|---|---|---|
| 8,726,241 B1* | 5/2014 | Limondin et al. ............ 717/126 |
| 8,850,270 B2* | 9/2014 | Heiper et al. ................ 714/38.1 |
| 2003/0084429 A1* | 5/2003 | Schaefer ........................ 717/125 |
| 2008/0263505 A1* | 10/2008 | StClair et al. ................ 717/101 |
| 2010/0175052 A1* | 7/2010 | Prasad et al. .................. 717/128 |
| 2013/0042145 A1* | 2/2013 | Pasupuleti et al. ............. 714/32 |

* cited by examiner

*Primary Examiner* — David Ton (57) ABSTRACT

This embodiment relates to software verification and in particular to automatic generation of Modified Condition/Decision Coverage (MC/DC) tests scenarios. A system and method for reducing Modified Condition/Decision coverage (MC/DC) test scenarios is described along with selection of test data automatically for an input Boolean expression. An MC/DC test case engine generates optimal test case for a Boolean expression using an algorithm. The optimal minimal number of MC/DC cases generated to for satisfy the MC/DC condition for 'n' number of inputs may be 'n+1'. The MC/DC test engine supports Boolean expression with Arithmetic and Comparison operators. The MC/DC test engine supports Boolean expression with no limitation on number of input variables.

8 Claims, 8 Drawing Sheets

|  | I/P 1 | I/P 2 | O/P |
|---|---|---|---|
| && | TRUE | TRUE | TRUE |
|  | TRUE | FALSE | FALSE |
|  | FALSE | TRUE | TRUE |
| \|\| | FALSE | FALSE | FALSE |
|  | FALSE | TRUE | TRUE |
|  | TRUE | FALSE | TRUE |
| ^ | TRUE | TRUE | FALSE |
|  | TRUE | FALSE | TRUE |
|  | FALSE | TRUE | TRUE |
| ! | TRUE | N/A | FALSE |
|  | FALSE | N/A | TRUE |

FIG. 3B

|   | X <operator> Constant | | | constant <operator> x | | | X <operator> Y | | |
|---|---|---|---|---|---|---|---|---|---|
|   | "-Δ" | "=" | "+Δ" | "-Δ" | "=" | "+Δ" | "-Δ" | "=" | "+Δ" |
| > | FALSE | FALSE | TRUE | TRUE | FALSE | FALSE | FALSE | N/A | TRUE |
| < | TRUE | FALSE | FALSE | FALSE | FALSE | TRUE | TRUE | N/A | FALSE |
| >= | FALSE | TRUE | TRUE | TRUE | TRUE | FALSE | FALSE | N/A | TRUE |
| <= | TRUE | TRUE | FALSE | FALSE | TRUE | TRUE | TRUE | N/A | FALSE |
| == | FALSE | TRUE | FALSE | FALSE | TRUE | FALSE | FALSE | TRUE | N/A |
| != | TRUE | FALSE | TRUE | TRUE | FALSE | TRUE | TRUE | FALSE | N/A |

FIG. 4

| Expression |
|---|
| (Active_Other\|\|((Air_Ground_Status&&(NVM_CCP_Mode&&((Comms_OK&&Comms_OK_Others)&&((N!=100)&&(N2>=200)))))) |
| ((T1_Bad\|\|(T2_Bad&&(T1!=T3)))\|\|(T3_Bad&&(T1!=T2))) |
| (((N1<N2)&&(N1<N3))&&(N2>N3))) |
| ((operability!=1)&&(operability!=2)&&((CurrentOppMode==2)\|\|(isMpumEnabled==1))) |
| (((((((target!=127)&&(target!=128))&&(target!=119))&&(target!=120))&&(target!=123))&&(target!=124))&&(using_a_bus_now==1))) |
| (((wait_for_2$^{nd}$_req>15)&&(TTPInitFailedCount>=0))\|\|((wait_for_3nd_req_>35)&&(TTPInitFailedCount>0))) |
| (((wait_for_2nd_req>15)\|\|(TTPInitFailedCount>=0))\|\|(wait_for_3nd_req_req>35)) |

FIG. 5

| Variable | DataType |
|---|---|
| N1 | Float |
| N2 | Float |
| N3 | Float |
| Active_Other | Boolean |
| Air_Ground_Status | Boolean |
| NVM_CCP_Mode | Boolean |
| Comms_OK | Boolean |
| Comms_OK_Others | Boolean |
| T1_Bad | Boolean |
| T2_Bad | Boolean |
| T3_Bad | Boolean |
| T1 | Int |
| T2 | Int |
| T3 | Int |
| operabilty | Int |
| currentOppMode | Int |
| isMpumEnabled | Int |
| target | Int |
| using_a_bus_now | Int |
| wait_for_2nd_req | Int |
| wait_for_3nd_req | Int |
| TTPInitFailedCount | Int |

FIG. 6

| Test Case No | Independency Calculated For | Filter Test Case Expression Output | IWM CCP Mode | Active Other | Comms OK | M2 | M1 | Air Ground Status | Comms OK Others |
|---|---|---|---|---|---|---|---|---|---|
| 1 | BH | 0 | false | true | false | true | 199.99 | 99.99 | true | true |
| 2 | Active Other | 1 | true | true | true | true | 199.99 | 99.99 | true | true |
| 3 | ¬ | 1 | true | true | false | true | 200.01 | 99.99 | true | true |
| 4 | Air Ground Status | 0 | false | true | false | true | 200.01 | 99.99 | false | true |
| 5 | IWM CCP Mode | 0 | false | false | false | true | 200.01 | 99.99 | true | true |
| 6 | Comms OK | 0 | false | true | false | false | 200.01 | 99.99 | true | true |
| 7 | Comms OK Others | 0 | true | true | false | true | 200.01 | 99.99 | true | false |
| 8 | ¬ | 0 | false | true | false | true | 200.01 | 100.01 | true | true |
| 9 | HIT CONDITION | 0 | true | true | false | true | 200 | 100.01 | true | true |

FIG. 7

MODIFIED CONDITION/DECISION COVERAGE TEST CASE AUTOMATION

PRIORITY DETAILS

The present application is based on, and claims priority from, Indian Application Number 3571/CHE/2012, filed on 29 Aug., 2012, the disclosure of which is hereby incorporated by reference herein.

TECHNICAL FIELD

This embodiment relates to software verification and in particular to automatic generation of Modified Condition/Decision Coverage (MC/DC) tests scenarios and test data's.

BACKGROUND

To verify proper implementation of software, software verification is an important phase in the development life cycle. In Avionics, software verification is considered even more critical and has to be verified based on the criticality of software. Coverage in testing refers to the extent to which a given verification activity has satisfied its objectives. Modified Condition Decision Coverage (referred as MC/DC in document) is one of the verification activities that are performed for structural coverage. MC/DC testing ensures that all the paths/branches in the code are exercised and the software behavior is as per requirement.

MC/DC criterion enhances the condition/decision coverage. Condition coverage requires that each condition in a decision take on all possible outcomes at least once and decision coverage ensures all possible outcomes are taken care of MC/DC ensures that every decision in the program has taken all possible outcomes at least once, every condition in a decision in the program has taken all possible outcomes at least once and every condition in a decision has been shown to independently affect that decision's outcome. MC/DC criterion enhances the condition/decision coverage criterion by requiring that each condition be shown to independently after the outcome of the decision and hence the MC/DC requires more thoughtful selection of test cases.

MC/DC provides a wide structural coverage by exhaustive testing, which is often expensive, time consuming and has complicated long codes. Developing of MC/DC test case is effort intensive and needs lot of understanding to generate optimal number of MC/DC test scenarios. Test cases are generally developed by manual process and heavily dependent on times, resource expertise and can seldom be considers consistent across projects. In most cases the test cases developed for a Boolean expression are not always effective. Automatic test case generating tools have been unsuccessful as the number of test cases produces is high which make them more time consuming and many test cases turn out to be unnecessary.

Object of Embodiment

The principal object of the embodiment is to automate the generation of Modified Condition/Decision Coverage (MC/DC) test scenarios and appropriate test data selection automatically for a given Boolean expression.

Another object of the embodiment is to reduce the number of Modified Condition/Decision Coverage (MC/DC) test scenarios Another object of the embodiment is to support comparison operators and various data types in Boolean expressions.

Statement of Embodiment

Accordingly the embodiment provides a system and method for reducing Modified Condition/Decision coverage (MC/DC) test scenarios and selection of test data automatically for a Boolean expression. For an input Boolean expression, a MC/DC test case application process interface is created and data types of each variable used in the Boolean expression are loaded into a data dictionary. The Boolean expression is then parenthesized and validated. A binary expression tree is generated and for each operator an MC/DC truth table conditions are assigned. The MC/DC test engine applies algorithm on the binary expression with truth table values and generated optimal MC/DC test cases and test data. The optimal MC/DC cases generated to satisfy the MC/DC condition for 'n' number of inputs may be 'n+1'.

The MC/DC test engine supports Boolean expression with arithmetic and comparison operations These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENT

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
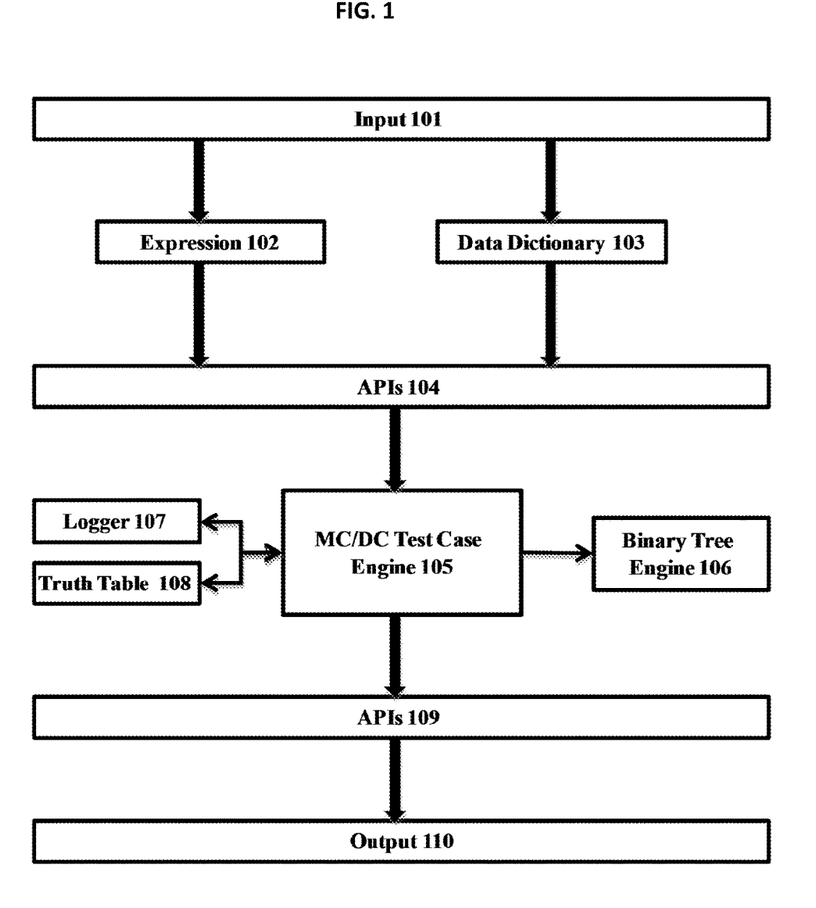
FIG. 1 illustrates a block diagram showing the MC/DC test case automation architecture, according to the embodiments disclosed herein.

FIG. 1 illustrates a block diagram showing the MC/DC test case automation architecture, according to the embodiments disclosed herein. FIG. 1 depicts the top-level architecture of MC/DC test case generation algorithm. The MC/DC test scenario generation is encapsulated under A Graphical User Interface (GUI) to provide a complete solution and ease of usage. The input expression(s) 102, whose MC/DC test case has to be identified, is (are) provided as input 101 along with the data type of all the variables. Each expression 102 in input is preprocessed, validated and the MC/DC test scenarios are generated using the MC/DC algorithm. The MC/DC of the input expression can be generated only if a valid data type of all the variables in the input expression is provided. A data dictionary 103 gets loaded with all the data types of each variable used in the input expression. The data dictionary is set using an application processing interface (API) 104 called setDataDictionaryAPI. The MC/DC test case engine 105 processes the received input expression(s) and finds the minimum number to test cases required to satisfy the MC/DC condition. The MC/DC test case engine 105 makes use of Binary Tree Engine 106 to convert the input expression into a binary tree. The MC/DC test case engine makes use of Truth table 108 to identify the MC/DC conditions of each operator node in the binary tree and an MC/DC algorithm is applied to the expression to generate MC/DC test cases. A logger 107 keeps track of all the processing. The identified test cases are processed using appropriate API's 109 and results are generated as output 110 in a tabular format showing various test cases, results, scenarios, expression results and so on.

Figure 2:
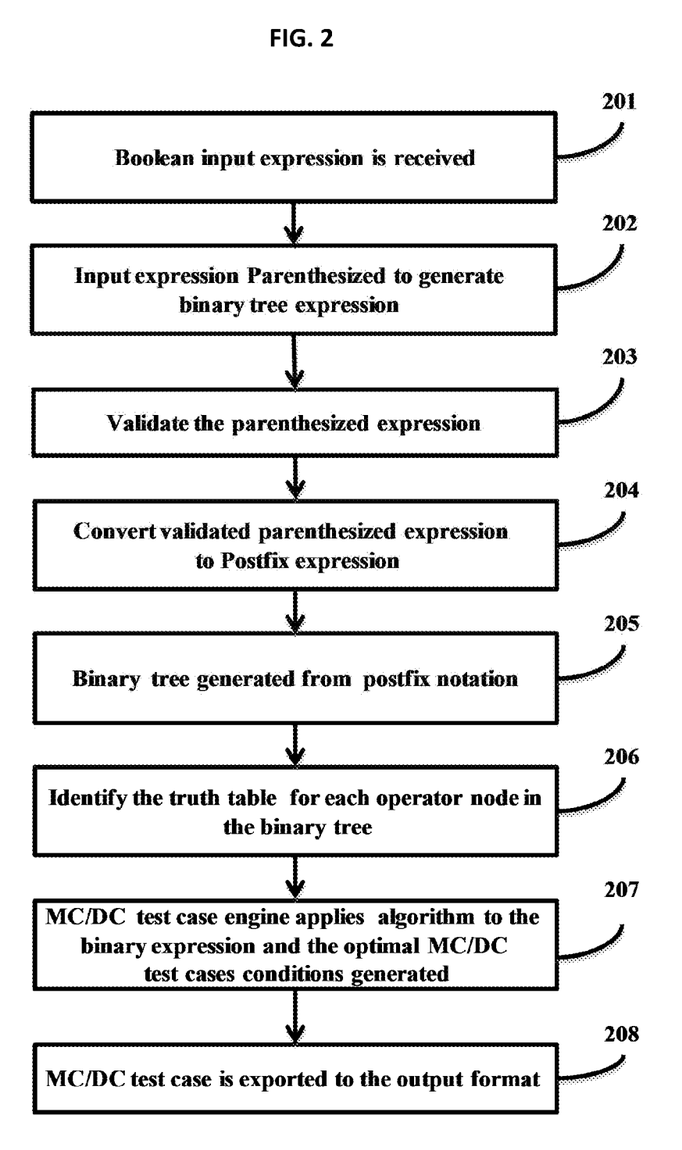
FIG. 2 is a flowchart describing the process flow for generating MC/DC test scenarios, according to the embodiments as disclosed herein.

FIG. 2 is a flowchart describing the process flow for generating MC/DC test scenarios, according to the embodiments as disclosed herein. The process begins with receiving 201 a Boolean expression as input. For creation of MC/DC test scenario, a createMCDCTestCase API defined in the API layer. The input expression is passed as an argument to the createMCDCTestCase API. The data types of each variable used in the input expression has to be loaded to the data dictionary. The data dictionary can set by using the setDataDictionary API. The input Boolean expression is broken to identify the properties of all the variables like data type, data range from the data dictionary. A parenthesis is performed 202 on the input Boolean expression to prioritize each condition in the input Boolean expression and is used for generating 202 a expression binary tree. The parenthesized expression is then validated 203 to ensure that all data types are valid. The validated parenthesized expression is then converted 204 to postfix notation. A binary expression tree is then generated 205 from the postfix output. Each operator node in the binary is assigned 206 with corresponding truth table value. MC/DC test case engine applies 207 algorithms to the binary expression and the optimal MC/DC test cases conditions are generated and exported 208 to an output format. The Output format may be an Excel file. The optimal test conditions are identified by following the steps below— a. Start with the Base Node (root node is the first node considered as Base Node) and identify the first test case which is going to be the base test case for all other MC/DC test cases
  b. Identify the Independency of the first operand using the base test case condition and add the identified test case condition into output MC/DC Test Case list
  c. Repeat step (b) for all the operands in the list and identify the Independency
  d. If the Independency of all the variables is not identified using the current base test case condition, repeat step (a) to (c) with the next operand in the binary tree
  e. Repeated step (d) until the independency of all the operands are identified The various actions in the method 200 can be performed in the order presented, in a different order or simultaneously. Further, in some embodiments, some actions listed in FIG. 2 can be omitted.

Figure 3A:
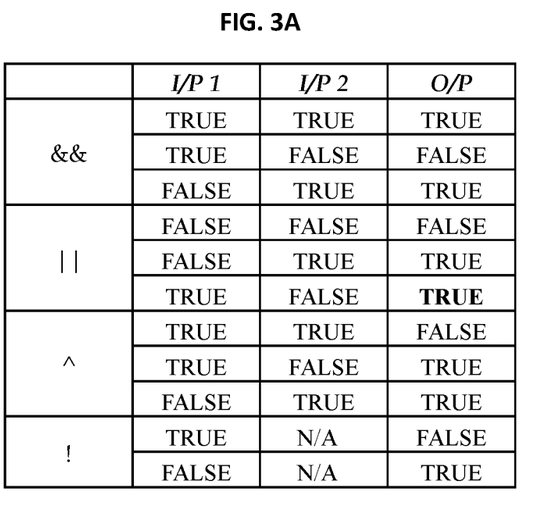
FIGS. 3A and 3B illustrates truth tables used for converting the input Boolean expression into MC/DC Output.
Figure 3B:
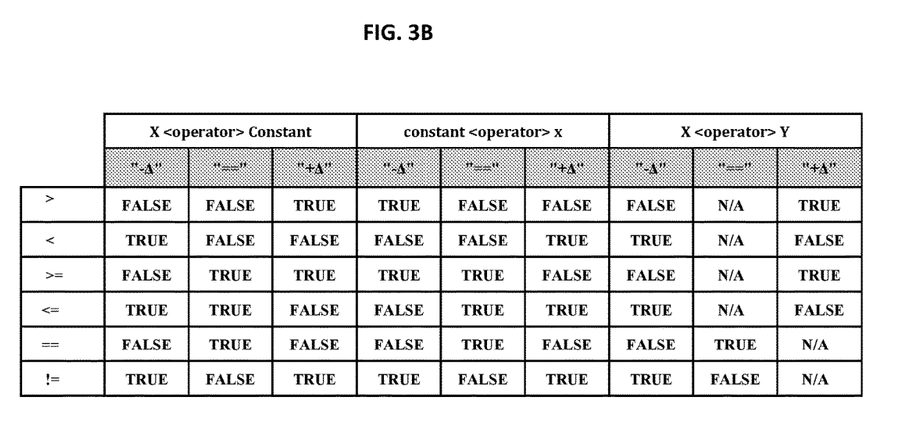

FIGS. 3A and 3B illustrates truth tables used for converting the input Boolean expression into MC/DC Output.

Figure 4:
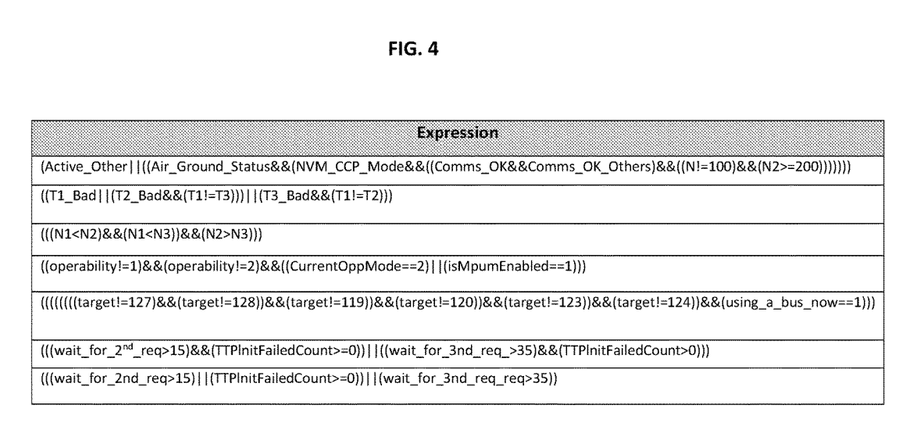
FIG. 4 is an example input Boolean expression for a test case, according to the embodiments as disclosed herein.

FIG. 4 is an example input Boolean expression for a test case, according to the embodiments as disclosed herein. The figure shows the pictorial representation of the input Boolean expression provided in the 'Expression' tab of the spreadsheet.

Figure 5:
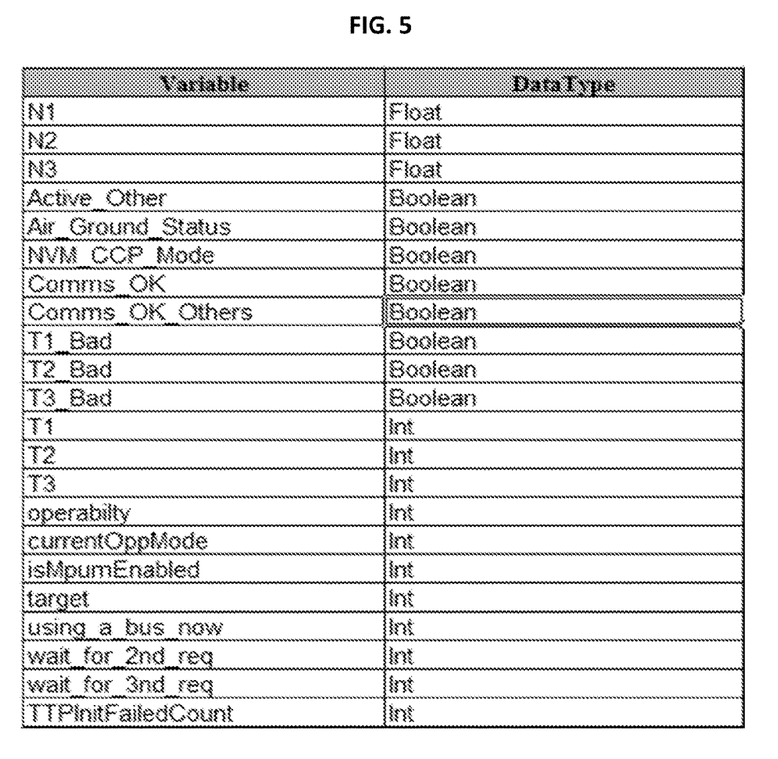
FIG. 5 shows the data types of all the variables used in the input Boolean expression, according to the embodiments as disclosed herein.

FIG. 5 shows the data types of all the variables used in the input Boolean expression, according to the embodiments as disclosed herein. The data types of the variables are provided through the 'Data Dictionary' tab of the input spreadsheet. This MC/DC test case engine 105 does not support Macros or constants. Any macro(s)/constant(s) that are available in the input expression have to be preprocessed with its corresponding values before providing the input to the MC/DC test case automation architecture. The architecture supports 'Int', 'Float' and 'Boolean' data types only and urinary operators '++' and '−−' are not supported by the architecture.

Figure 6:
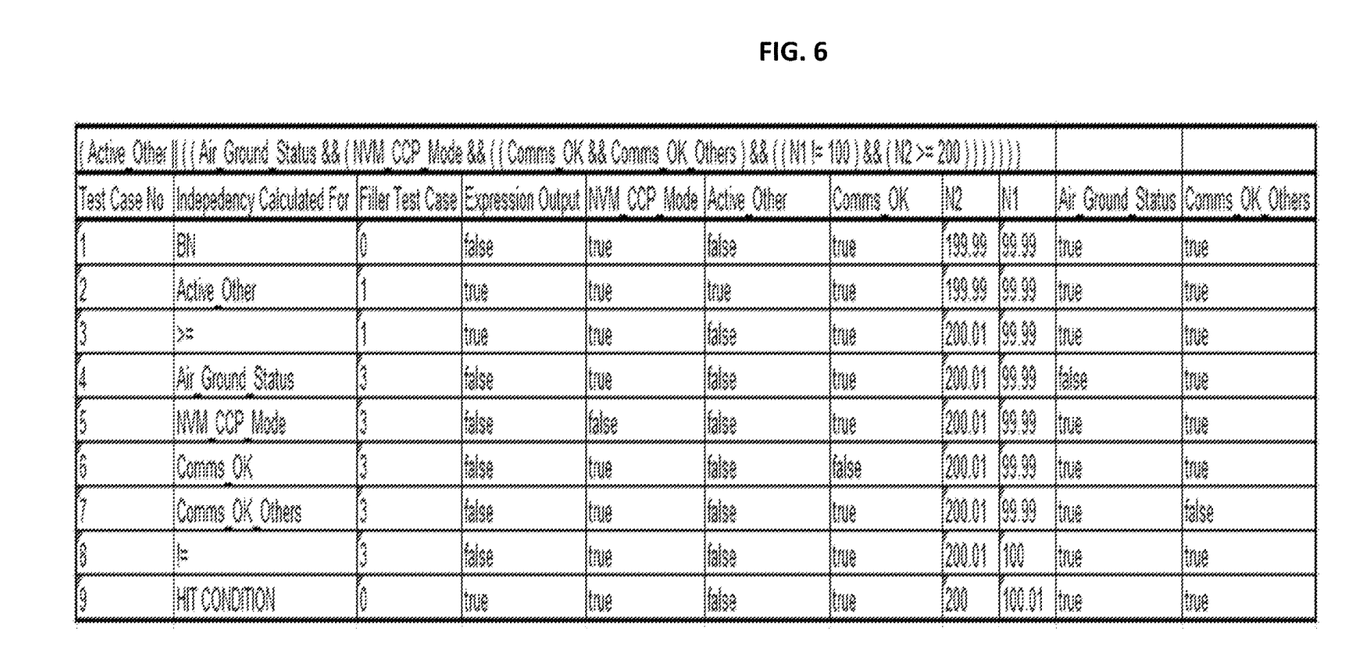
FIG. 6 is the MC/DC Test Case output for the given input test Boolean expression, according to embodiments disclosed herein.

FIG. 6 is the MC/DC Test Case output for the given input test Boolean expression, according to embodiments disclosed herein. The pictorial representation of the MC/DC Test Case output for the input Boolean expression given in the 'Expression' tab of the input spreadsheet. The output data is formatted with the corresponding input Boolean expression and its MC/DC Test Case scenarios with the data to satisfy the MC/DC criterion.

Figure 7:
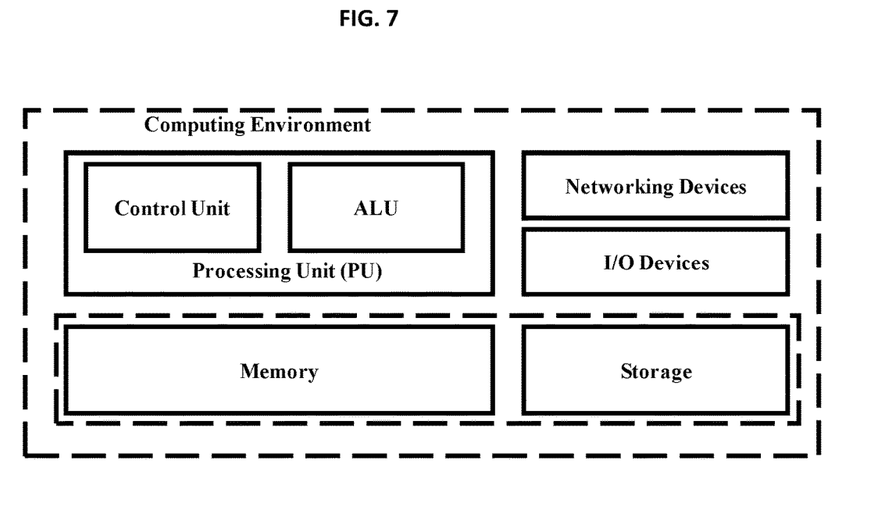
FIG. 7 illustrates a computing environment used in implementing the application, according to embodiments disclosed herein.

FIG. 7 illustrates a computing environment used in implementing the application, according to embodiments disclosed herein. As depicted the computing environment comprises at least one processing unit that is equipped with a control unit and an Arithmetic Logic Unit (ALU), a memory, a storage unit, plurality of networking devices, and a plurality Input output (I/O) devices. The MC/DC test automation architecture may be implemented using the computing environment described below. The processing unit is responsible for processing the instructions of the algorithm. The processing unit may contain the MC/DC test case engine 107. The processing unit receives commands from the control unit in order to perform its processing. Further, any logical and arithmetic operations involved in the execution of the instructions are computed with the help of the ALU.

The overall computing environment can be composed of multiple homogeneous and/or heterogeneous cores, multiple CPUs of different kinds, special media and other accelerators. Further, any logical and arithmetic operations involved in the execution of the instructions are computed with the help of the ALU. Further, the plurality of process units may be located on a single chip or over multiple chips.

The algorithm comprising of instructions and codes required for the implementation are stored in either the memory unit or the storage or both. At the time of execution, the instructions may be fetched from the corresponding memory and/or storage, and executed by the processing unit. In case of any hardware implementations various networking devices or external I/O devices may be connected to the computing environment to support the implementation through the networking unit and the I/O device unit.

The embodiments disclosed herein can be implemented through at least one software program running on at least one hardware device and performing network management functions to control the elements. The elements shown in FIG. 7 include modules, which can be at least one of a hardware device, or a combination of hardware device, and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for reducing Modified Condition/Decision Coverage (MC/DC) test scenarios and selection of test data automatically for a Boolean expression, said method comprising:
    creating a Modified Condition/Decision Coverage (MC/DC) test case application process interface for the input Boolean expression;
    loading data types of each variable in the Boolean expression into the data dictionary;
    parenthesizing and validating the Boolean expression;
    generating a binary tree representation of the Boolean expression;
    assigning Modified Condition/Decision Coverage (MC/DC) truth table conditions to each operator node in the binary expression tree;
    applying algorithm using Modified Condition/Decision Coverage (MC/DC) test case engine; and
    generating optimal Modified Condition/Decision Coverage (MC/DC) test cases.

2. The method of claim 1, wherein said optimal Modified Condition/Decision Coverage (MC/DC) cases generated to for satisfy the Modified Condition/Decision Coverage (MC/DC) condition for 'n' number of inputs may be 'n+1'.

3. The method of claim 1, wherein said Modified Condition/Decision Coverage (MC/DC) test engine is configured to support Boolean expression with no limitation on number of input variables.

4. The method of claim 1, wherein said Modified Condition/Decision Coverage (MC/DC) test engine supports Boolean expression with at least one of arithmetic, logical and comparison operations.

5. A computer-implemented system for reducing Modified Condition/Decision Coverage (MC/DC) test scenarios and selection of test data automatically for a Boolean expression, said system comprising:
    a processing unit; and
    at least one of a memory unit and a storage, wherein said at least one of said memory unit and said storage comprises a plurality of instructions, said instructions configured to cause said processing unit to:
    create an Modified Condition/Decision Coverage (MC/DC) test case application process interface for the input Boolean expression:
    load data types of each variable in the Boolean expression into the data dictionary;
    parenthesize and validate the Boolean expression;
    generate a binary tree representation of the Boolean expression;
    assign Modified Condition/Decision Coverage (MC/DC) truth table conditions to each operator node in the binary expression tree;
    apply algorithm using Modified Condition/Decision Coverage (MC/DC) test case engine; and
    generate optimal Modified Condition/Decision Coverage (MC/DC) test cases.

6. The system of claim 5, wherein said optimal Modified Condition/Decision Coverage (MC/DC) cases generated to satisfy the Modified Condition/Decision Coverage (MC/DC) condition for 'n' number of inputs may be 'n+1'.

7. The system of claim 5, wherein said Modified Condition/Decision Coverage (MC/DC) test engine is configured for supporting Boolean expression with no limitation on number of input variables.

8. The system of claim 5, wherein said Modified Condition/Decision Coverage (MC/DC) test engine supports Boolean expression with at least one of arithmetic, logical and comparison operations.

* * * * *